United States Patent [19]

Ragni

[11] Patent Number: 4,841,603
[45] Date of Patent: Jun. 27, 1989

[54] RECLOSABLE SEAMS FOR FLUID-TIGHT APPLICATIONS

[75] Inventor: Richard K. Ragni, Crystal Lake, Ill.
[73] Assignee: Minigrip, Inc., Orangeburg, N.Y.
[21] Appl. No.: 944,964
[22] Filed: Dec. 22, 1986
[51] Int. Cl.$^4$ ............................................. A41F 1/00
[52] U.S. Cl. ................................ 24/576; 24/587; 24/588; 206/522; 383/63; 383/3
[58] Field of Search ............... 24/576, 587, 578, 588; 206/522; 383/63, 3; 73/45.5, 49.2, 49.3, 52, 861.41, 861.42

[56] References Cited

U.S. PATENT DOCUMENTS

| | | | |
|---|---|---|---|
| 2,519,290 | 8/1950 | Saltz | 24/588 X |
| 2,637,085 | 5/1953 | Madsen | 24/576 |
| 3,085,187 | 10/1962 | Gugen | 24/587 |
| 3,440,696 | 4/1969 | Staller | 24/587 X |
| 3,918,131 | 11/1975 | Ausnit | 24/576 |
| 3,986,914 | 10/1976 | Howard | 383/63 X |
| 4,155,453 | 5/1979 | Ono | 206/522 |
| 4,212,337 | 7/1980 | Kamp | 383/63 |
| 4,447,935 | 5/1984 | Ausnit | 24/576 X |
| 4,528,224 | 7/1985 | Ausnit | 383/63 X |

FOREIGN PATENT DOCUMENTS

| | | | |
|---|---|---|---|
| 571894 | 1/1958 | Italy | 24/576 |
| 284060 | 11/1952 | Switzerland | 24/576 |

Primary Examiner—Kenneth J. Dorner
Assistant Examiner—Laurie K. Cranmer
Attorney, Agent, or Firm—Hill, Van Santen, Steadman & Simpson

[57] ABSTRACT

An interlocking structure and a method of testing wherein the structure includes spaced interlocked rib and groove members with a compartment therebetween exposed to one side of each of the interlocked ribs and grooves and the ribs and grooves submerged beneath water while the compartment is pressurized with air so that any leakage past the interlocked rib and grooves will be detected by bubbles rising through the water.

9 Claims, 1 Drawing Sheet

RECLOSABLE SEAMS FOR FLUID-TIGHT APPLICATIONS

BACKGROUND OF THE INVENTION

The invention relates to improvements in interlocking flexible plastic fasteners and more particularly to continuous fasteners having interlocking ribs and grooves wherein the fasteners have fluid-tight integrity with the fastener structure providing means for testing the fluid-tight integrity.

Interlocking ribs and grooves which are fluid-tight or leak-proof have heretofore been provided and an example of such structure is shown in U.S. Pat. No. 3,918,131, Steven Ausnit, issued Nov. 11, 1975. Such fasteners are frequently used in environments wherein the fluid-tight nature (either vapor or liquid) is required and leakage cannot be tolerated. This type of fastener is continuous and is conveniently made in substantial quantities by extrusion from polyethylene, PVC, polyurethane or other similar flexible thermoplastic through a die opening shaped in accordance with the shape of the rib and groove. Subsequently the rib and groove are interlocked to provide a fastener having fluid-tight integrity. During the extrusion process and cooling thereafter, small variations in tolerance or surface defects can occur in the rib and groove, so that a source of possible leakage can occur where the ribs and grooves do not fit tightly to each other in surface-to-surface engagement.

In environments where vapor or liquid-tight integrity must be maintained such as in the isolation of chemicals or certain toxic materials, it is critical to be able to test the fastener either before and/or after installation, in order to be assured that the fluid-tight integrity is present. Such testing cannot employ the use of any deleterious materials such as dyes or gases which would damage the fastener or which might use substances which would adhere to the fastener that would adversely affect the material which is being protected. Also, it may be necessary to pressure test the fastener where pressure differences would exist across the fastener in its use. Other examples of uses where the leak-proof integrity of fasteners must be employed are in uses in the construction trade where the fasteners are used to keep out the elements. Fasteners, for example, joining waterproof surfaces, have been used to protect various contents which can be damaged by rain, sleet or snow.

It is accordingly an object of the present invention to provide a flexible fastener which has an improved means for testing its fluid-tight integrity and for easily detecting whether any leaks are present. A further object of the invention is to provide a method and structure for testing the fluid-tight integrity of a rib and groove zipper structure.

A still further object of the invention is to provide a zipper structure wherein the capability of testing for leaks is inherent in the unique structure and where the particular capability is present that the fluid-tightness of the structure can be tested after installation on the site or in the environment in which it is to be used and wherein testing can be re-establishing periodically after installation.

A feature of the invention is the provision of a flexible plastic fastener having spaced interlocking rib and groove elements thereon with a built-in compartment or passageway therebetween adapted to be pressurized by a fluid so that testing of the fastener can be accomplished by pressurizing the compartment and observing leakage. This could be accomplished, for example, by pressurizing the compartment with air and placing the fastener under water to observe if air bubbles occur as a result of leakage between the surfaces of the interlocked rib and groove members of the fastener.

Other objects, advantages and features will become more apparent with the teaching of the principles of the invention in connection with the disclosure of the preferred embodiments thereof in the the specification, claims and drawings in which:

DESCRIPTION OF THE PREFERRED EMBODIMENTS

Figure 1:
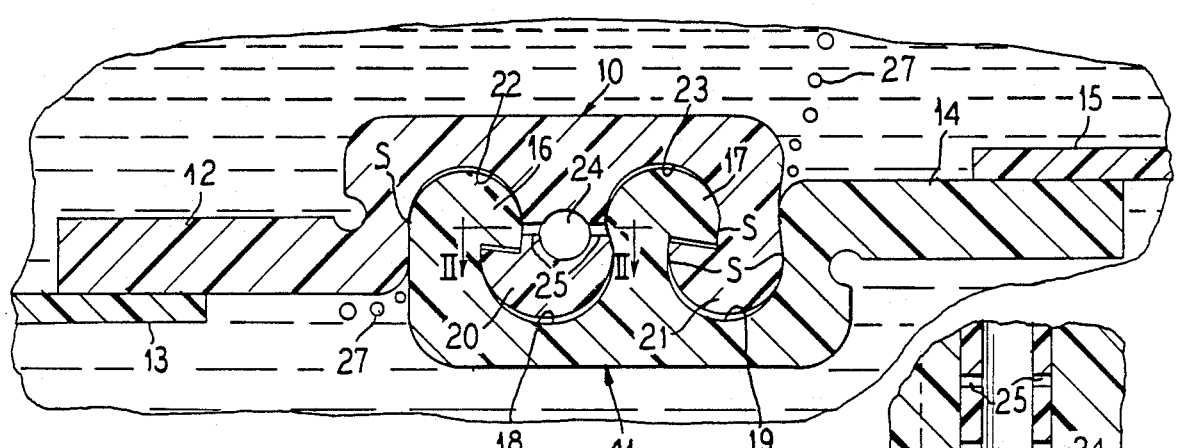
FIG. 1 is a sectional view taken through a fastener constructed in accordance with the principles of the present invention.

FIG. 1 illustrates a fastener of the fluid-tight type wherein first and second interlocking members 10 and 11 have first and second coacting rib and groove elements thereon adapted to be interlocked and to seal at the interlock.

The interlocking member 11 has ribs or heads 16 and 17 thereon which are interlockingly received in grooves 22 and 23 in the interlocking member 10. The heads 16 and 17 of the member 11 are spaced with shaped grooves 18 and 19 therebetween to receive heads 20 and 21 of the interlocking member 10. The heads and grooves are shaped to have overhanging shoulder portions so that a firm interlock is created. The members 10 and 11 are formed of a flexible plastic such as polyethylene, PVC, etc. and the heads and grooves are shaped so that a fluid-tight interlock will result at several locations where the heads and grooves come into tight contact. By way of example, the interlocking members may form the juncture between sheets of plastic on the roof of a building under construction and the interlock must be such that water does not leak through.

The interlocking members have webs shown at 12 for the member 10 and at 14 for the member 11 and these webs are secured such as by heat sealing to suitable sheets 13 and 15 which may be plastic tarpaulins.

It will be observed that if leakage is going to occur past the interlocking members 10 and 11, it must occur by fluid flowing past the surfaces of the heads and grooves which are pressed together. If the heads are sized so they fit firmly in the grooves, and these surfaces come into tight contact in several locations, as they are supposed to, a fluid-tight seal will result. If the cooling of the fastener during manufacture was uneven, variations in the fasteners dimensions could result. These, in turn, could mean that there would be no points of tight contact between the fastener surfaces, thereby allowing leakage to take place. Alternately, if a defect such as a lump or a valley has inadvertently occurred during manufacture, the surface contact points could be separated so that moisture or vapor can leak through. It will be recognized that there are many environments wherein a fluid-tight barrier must be provided by the fastener which cannot or should not be permitted to leak such as where the fastener is used with moisture on one side and moisture susceptible material such as chemicals on the other side or where the fastener is used to join surfaces containing a toxic substance that must be prevented from leaking through the fastener joint. Other environments may involve separation of environments where different gases are on opposite sides of the fastener which cannot be permitted to mix and even where there is a pressure differential across the fastener. In these cases it is essential that the fastener can be tested before use so that the user will not first know of the leakage only when the fastener is used but can replace the fastener if he knows that the possibility of leakage is present.

Figure 2:
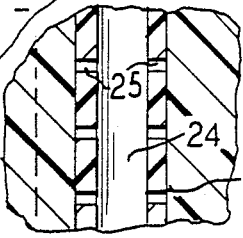
FIG. 2 is a fragmentary sectional view taken substantially along line II—II of FIG. 1.

For this purpose a compartment is placed between the surfaces which seal, that is between the interlocked rib and grooves to allow pressurizing the center of the seal. This compartment is shown at 24 in the form of a tunnel or channel extending continuously through the head 20. The compartment 24 is constructed so that it has lateral passages 25, FIGS. 1 and 2, which allow the pressurized testing fluid which is placed in the compartment 24 to reach the sealed locations so as to be able to leak past the seal if the seal is imperfect.

In accordance with the method of the invention, a test procedure would involve pressurizing the compartment 24 with a pressurized fluid such as pressurizing the compartment with air. The fastener assembly of the interlocking members 10 and 11 is then submerged beneath water and if any leakage is present between the seals, air bubbles such as shown at 27 will appear. Because the compartment 24 is actually intermediate the sealing heads, the test is more effective than if pressure were applied only at one side of the entire seal, that is, at one side of the interlocking member to leak through to the other side. Also since the test compartment 24 is between sealing locations, and the sealing locations are indicated by the letter S on FIG. 1, if a small leak occurs, the tester can seek to repair the leak inasmuch as the location will be accurately indicated.

Figure 3:
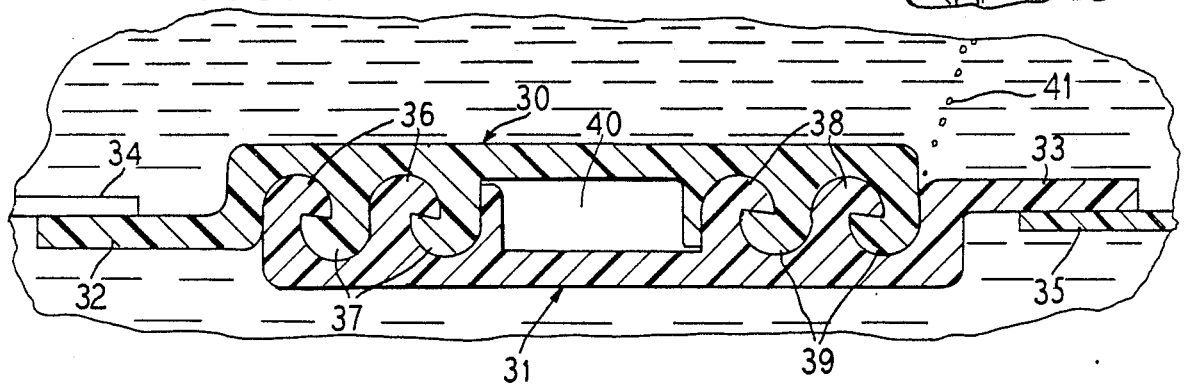
FIG. 3 is a sectional view, similar to FIG. 1, but illustrating another embodiment of the invention.

The concept is included in the arrangement of FIG. 3 wherein opposed interlocking members 30 and 31 are interlocked. The member 30 has ribs 37 and 39 which are received in grooves in the interlocking member 31 and the grooves are shaped so that the member 31 has heads 36 and 38 received by and interlocked in grooves in the member 30. In this instance a seal will be provided between the snug surfaces which occur between the ribs and grooves and the fastener material will be sized so that the ribs and grooves are essentially the same dimensions so that many points of firm surface-to-surface sealing will result.

The interlocking member 30 has a web 32 for attachment to sheet 34, and the interlocking member 31 has a web 33 for attachment to a sheet 35. The illustration of FIG. 3 shows one type of fluid at one side of the seal and another type at the other side.

An important feature is the provision of a compartment or tunnel 40 extending down the length of the continuous fastener between the sets of interlocked ribs and grooves. This compartment will be pressurized so that if a leak exists, and the unit is placed under water, air bubbles such as shown at 41 or 41a will appear.

Figure 4:
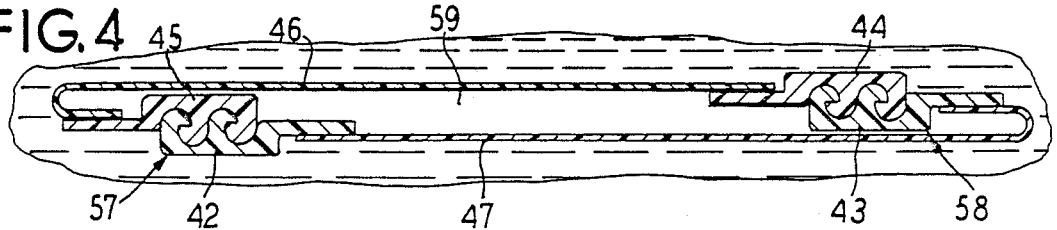
FIG. 4 is a sectional view illustrating a still further embodiment.

FIG. 4 illustrates still another form of utilizing the invention where individual fasteners can be tested. One fastener shown at 57 has a first interlocking member 45 interlocking with a second interlocking member 42. Another fastener 58 has a first interlocking member 44 interlocking with a second interlocking member 43. For testing, the interlocking members are attached to webs 46 and 47 so as to form a closed compartment 59 therebetween. The compartment 59 can be pressurized such as with air and the assembly is submerged under water whereupon the presence of bubbles will indicate any leakage that occurs with either the fastener members 57 or 58. With this arrangement, individual fastener members can be temporarily attached to sheets for testing the fastener members. Or the webs 46 and 47 may be part of the eventual structure with which the fasteners are to be used.

Figure 5:
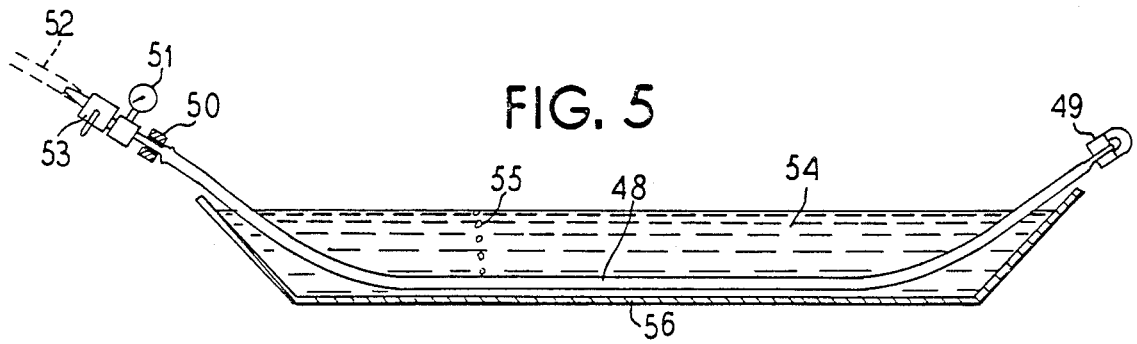
FIG. 5 is a schematic view illustrating the manner of testing leakage of a fastener.

FIG. 5 illustrates an elongate fastener under test conditions. The fastener 48 is submerged beneath water 54 in a container 56, and one end of the fastener is clamped by a clamp 49. The other end is attached to an air connector 50 which is supplied by pressurized air through a supply 52 through a valve 53, and a gauge 51 will indicate the pressure in the fastener 48. The fastener will be of the construction shown in any of the FIGS. 1 through 4, and if a defect in the fastener is present which would allow leakage in eventual use, it will be apparent from bubbles 55 arising from the leak. Alternatively, leakage can be observed or detected by means of suitable instrumentation, such as gauge 51. The pressure to which the fastener is submitted will be predetermined by the strength of the fastener and the conditions to which it has to eventually be subjected in use.

In operation, the fastener such as shown in FIG. 1 has a compartment 24 down through the center. This compartment is pressurized and such pressurization may occur before installation use of the fastener or the compartment permits testing of the fastener periodically after it has been installed. Whereas a simple leakage test may be conducted by pressurizing the compartment 24 with air and placing the fastener under water, other forms of non-damaging fluids may be injected under pressure into the compartment 24 such as a colored gas or detectable gas and leakage can be either observed or detected by the escape of gas at the location of the leakage. The seal then can be replaced or repaired. In certain instances, such as fasteners joining sheets at the bottom of a pond surface, if the ends of the fasteners are sealed, the air pocket contained within the fastener compartment, will require no outside pressurizing source, since the weight of the liquid on the fastener will create the pressure required to test leakage. Thus, it will be seen that there has been provided an improved flexible fastener with a method of testing the fastener for the presence of leakage, and the above objectives and advantages are provided with an arrangement which does not in any way adversely affect the strength or integrity of the fasteners but which provides an easy way of testing either before or during use.

I claim as my invention:
1. A flexible closable continuous interlocking structure comprising in combination:
   first and second spaced elongate flexible interlocking fasteners each having coacting rib and groove elements thereon with each of the rib elements adapted to be interlockingly received by a groove element for forming seals having fluid-tight integrity;
   a compartment between said spaced fasteners adapted to receive a fluid above atmospheric pressure, said compartment being exposed to an internal side of said elements so that when said compartment is pressurized above atmospheric by said fluid and defects in the fluid-tight integrity between the surfaces of the interlocked rib and groove elements can be detected by the leaking of said fluid from the compartment between the interlocked rib and groove elements along their length;

and means connected to said compartment for introducing said fluid at above atmospheric pressure into said compartment for testing the length of said elongate fastener for fluid-tight integrity.

2. A flexible closable continuous interlocking structure constructed in accordance with claim 1:
wherein said means is an air pressure connection for said pressurizing of the compartment above atmospheric pressure.

3. A flexible closable continuous interlocking structure constructed in accordance with claim 1:

4. A flexible closable continuous interlocking structure constructed in accordance with claim 1:
wherein said rib and groove elements each have a plurality of ribs and grooves respectively.

5. A flexible closable continuous interlocking structure constructed in accordance with claim 1:
wherein a web extends between the elements on said first fastener and another web extends between the elements on said second fastener with said compartment formed between said webs.

6. A flexible closable continuous interlocking structure constructed in accordance with claim 1:
wherein said compartment is comprised of a continuous tunnel defined by walls of said fasteners.

7. The method of testing the leak-proof integrity of a flexible continuous elongate interlocking structure including an interlocked rib and groove comprising the steps:
providing a pressure chamber exposed to the length of one side of the interlocked rib and groove;
directing a supply of a pressurized fluid above atmospheric pressure into said chamber;
and detecting the presence of fluid at any location on the other side of said rib and groove along the length thereof so that the existance and quantity of fluid on the other side will provide a determination of the fluid integrity of the interlock between the rib and groove at the location where leakage occurs along said length.

8. The method of testing the leak-proof integrity of a flexible continuous interlocking structure including a rib and a groove in accordance with the steps of claim 8:
including a second rib and groove having one side exposed to said pressure chamber along the length thereof;
and also detecting the presence of fluid on the other side of said second rib and groove along the length thereof for simultaneous determination of the fluid-tight integrity of both sets of ribs and grooves.

9. The method of testing the leak-proof integrity of a flexible continuous interlocking structure including a rib and a groove in accordance with the steps of claim 7:
including submerging the rib and groove under water so any leakage past the interlocked rib and groove will be evidenced by bubbles rising through the water.

* * * * *